(No Model.)

W. J. PERDUE.
RAILROAD TICKET.

No. 559,598. Patented May 5, 1896.

UNITED STATES PATENT OFFICE.

WILLIAM J. PERDUE, OF FORT SMITH, ARKANSAS.

RAILROAD-TICKET.

SPECIFICATION forming part of Letters Patent No. 559,598, dated May 5, 1896.

Application filed February 11, 1896. Serial No. 578,879. (No specimens.)

*To all whom it may concern:*

Be it known that I, WILLIAM J. PERDUE, a citizen of the United States of America, residing at Fort Smith, in the county of Sebastian and State of Arkansas, have invented certain new and useful Improvements in Railroad-Tickets, of which the following is a specification.

This invention relates to that class of railroad-tickets known as "conductors' cash-fare" tickets, in which a part of the ticket is given to the passenger as a receipt for his fare, and another part, containing a record of the amount received by the conductor, is retained by him and turned in to the auditor. Such tickets have primarily in view the protection of the passenger and company against the dishonesty of conductors; but as far as I am aware nothing has heretofore been devised which gives entire satisfaction.

The object of my invention is to improve railroad-tickets of this class, so as to afford complete protection, both to the passenger and to the company, without imposing undue labor upon the conductor.

In the accompanying drawings, illustrating my invention, Figure 1 is a front view of one of my cash-fare tickets. Fig. 2 is a similar view of the parts separated, and Fig. 3 is a transverse section through a book or pad of the tickets.

The tickets are of course made of paper or other similar material, arranged in book or pad form, as indicated in Fig. 3, each book or pad containing any desired number, preferably one hundred tickets.

A indicates the passenger's end of the ticket, and B the auditor's end thereof. In the passenger's end, A, of the ticket, near the top thereof, there is a space $a$ for the name of the railroad, a space $b$ for the number of the ticket, and a space $c$ for the number of the book. Information for the passenger as to the use of the ticket is printed at $d$, and there are spaces $e$ and $f$ for the number of the train and the date of the trip, respectively.

At $g$ and $h$ are spaces containing, respectively, the words "West" and "East" (or they might contain the words "North" and "South") for the purpose of indicating the direction in which the train is moving on the trip when the ticket is issued.

At $i$ and $j$ are semicircular spaces, the one containing the words "White passenger" and the other the words "Colored passenger." The peripheries of the semicircles are indented or perforated, in order that the semicircular pieces may be readily removed. The signature of the passenger-agent or ticket-agent may be inserted in the space $a'$. At the opposite end of the ticket there is what I call the "auditor's check." This contains characters indicating the months of the year, the days of the month, and also the year, a space $k$ in which to insert the number of the train, and spaces $l$ $m$ in which to insert, respectively, the place from which and the place to which the passenger is traveling. Spaces $n$ $o$ are provided to indicate the direction in which the train is moving, while spaces $p$ $r$ are for the purpose of indicating the name of the conductor and the number of the ticket.

The words "Auditor's check" are printed in the space $r'$, and in this space may also be printed the name of the road. In the space $r^2$ are printed the words "Half-fare," "White," "Colored" to indicate, when punched, that a half-fare only is collected and that the passenger is either white or colored. In the space $r^3$ is printed the number of the book, and in the space $r^4$ are printed instructions to the conductor, and in this space there is also room for the signature of the passenger-agent or ticket-agent. In the spaces $r^5$ are printed the words "Sleeper," "White," "Colored," and also the word "Coach" and the numbers "1," "2," "3," and "4."

The ends A and B of the ticket are connected by four strips C D E F. These strips are separated by three longitudinal slits or slots $x$. The strips are all connected at the top to the passenger's check A, and the strips D and E are connected at the bottom to the auditor's check B. The outside strips C and F, however, are separated from the auditor's check B by slits or slots $y$, which are preferably inclined, as shown. Each one of these columns contains a vertical row of characters indicating sums of money. The characters in the columns C and D increase in value from top to bottom of the columns from fifty cents to twelve dollars and fifty cents, the first character, "50¢," in the column D being arranged one space or step below the corresponding character in the column C. The outside columns C and F are each designated "Passenger's check," while the inside columns D and E are each designated "Auditor's check." In the columns E and F are vertically-arranged characters indicating cents in regular progression from one cent to forty-nine cents, the first character, "1 cent," in the column E being arranged one step or space below the corresponding character in the column F. The exact manner, however, of arranging the characters is not important—that is to say, the values may increase by a difference of one dollar, twenty-five cents, or other desired amount. The characters selected are, however, preferred.

In issuing a ticket the conductor removes one of the pieces $i j$ to indicate whether the passenger is white or colored. The date of the ticket having been indicated, he writes in the number of the train on the passenger's check and punches in either $g$ or $h$ to indicate the direction in which the train is moving. On the auditor's check he fills in the number of the train, the place from which and to which the passenger is traveling, inserts his own name, and indicates properly the date when the ticket is issued. He also, on this check, punches to indicate whether the passenger is white or colored in the space $r^2$ if a half-fare is collected, or in the space $r^5$ if full fare is collected, indicating in the latter case the number of the coach or the number of the sleeper where the passenger is located. In this way, should disputes arise or evidence be required to convict a conductor of dishonesty, witnesses may be obtained much more readily than by any other method with which I am acquainted.

To indicate the fare collected, the conductor severs the passenger's end of the ticket from the auditor's end. If the entire fare is indicated in the columns C and D, then the strips E and F are severed from the passenger's check above both rows of characters in the columns, and the columns C and D are torn properly beneath the proper figures. On the other hand, if the fare is less than fifty cents and is indicated in the columns E and F then the strips C and D are severed from the passenger's check above the characters in the columns, and the strips E and F are torn below the proper figures. When, however, the exact fare is not indicated on any one of the columns, all of the strips must be torn between the proper numbers to indicate the exact fare.

Assuming that the fare collected is five dollars and thirty cents, the conductor tears on the zigzag line $z$, and also on the zigzag line $z'$. The ends C' and F' of the strips C and F fall on the floor. The passenger receives the part of the ticket marked X in Fig. 2, while the conductor retains the part marked Y, to be turned in to the auditor. It will be observed that the column C indicates at $y'$ five dollars, while the column F indicates at $y^2$ thirty cents, the exact amount paid by the passenger, while the auditor's check indicates at $x'$ and $x^2$ the amount received by the conductor. The conductor cannot so alter the auditor's check as to indicate that he received a less amount than was paid by the passenger, because if he further tears from the strips D and E he will raise the amounts instead of diminishing them.

The conductor should be prohibited from picking up the remnants C' and F', and in case of necessity these remnants may be collected at the end of any trip by a detective or "spotter," who could compare them with the corresponding checks of the passenger and auditor, the number of the book and the number of the ticket being indicated at $y^3$ on both remnants. Should the conductor first tear off a less amount than is actually paid, ostensibly by mistake, but for the real purpose of changing the ticket afterward, it may be readily detected by reason of the fact that instead of there being two remnants, C' and F', these remnants would be divided. It will thus be seen that all contingencies are provided for, and that there is no possible chance of dishonesty on the part of the conductor without detection.

I claim as my invention—

1. A railroad-ticket having at one end a passenger's check and at the opposite end an auditor's check, said checks being connected by four strips separated by three slits, or slots, all of said strips being connected to the passenger's check, and two of them to the auditor's check, the two outside strips being disconnected from the auditor's check and each of said strips having columns of characters designating sums of money, substantially as and for the purpose specified.

2. A railroad-ticket having a passenger's check at one end and an auditor's check at the other, strips separated by a slit, or slot, connecting the passenger's check and the auditor's check, one or more of said strips being separated by a slit, or slot, $y$, from the auditor's check, substantially as and for the purpose specified.

3. A railroad-ticket having at one end a passenger's check and at the opposite end an auditor's check, the said checks being connected by four strips separated by three slits or slots, all of said strips being connected to the passenger's check and the two central strips to the auditor's check, the two outside strips being separated from the auditor's check by inclined slots $y$, and each strip containing characters designating sums of money, said passenger's check containing the separable pieces, $i, j$, spaces for the name of the railroad, the number of the train, the date of the trip, and designations of the direction in which the train is moving, and said auditor's check containing characters to designate the date of the trip, and spaces to indicate the direction in which the train is moving, the number of the train, the place from which and to which the train is moving, the color of the passenger and the car in which he is located.

In testimony whereof I have hereunto subscribed my name.

WILLIAM J. PERDUE.

Witnesses:
C. E. CARSTARPHEN,
T. P. WINCHESTER.